(12) United States Patent
Erdei et al.

(10) Patent No.: US 6,513,540 B2
(45) Date of Patent: Feb. 4, 2003

(54) SYSTEM AND METHOD FOR USING BENT PIPES IN HIGH-PURITY FLUID HANDLING SYSTEMS

(75) Inventors: Nicolae M. Erdei, Los Gatos, CA (US); Todd A. Mays, Ben Lomond, CA (US)

(73) Assignee: Therma Corporation, Inc., San Jose, CA (US)

( * ) Notice: Subject to any disclaimer, the term of this patent is extended or adjusted under 35 U.S.C. 154(b) by 81 days.

(21) Appl. No.: 09/854,132

(22) Filed: May 11, 2001

(65) Prior Publication Data

US 2002/0166590 A1 Nov. 14, 2002

(51) Int. Cl.$^7$ .............................................. F17D 1/04
(52) U.S. Cl. .............................. 137/15.01; 137/565.23; 118/715
(58) Field of Search ..................... 137/15.01, 565.23, 137/561 R; 118/715

(56) References Cited

U.S. PATENT DOCUMENTS

| 4,887,645 A | * 12/1989 | Kerger .................... 137/561 R |
| 5,690,743 A | * 11/1997 | Murakami et al. .......... 118/715 |
| 5,789,086 A | * 8/1998 | Ohmi .......................... 148/280 |
| 6,223,770 B1 | * 5/2001 | Snow ..................... 137/565.23 |
| 6,224,676 B1 | * 5/2001 | Nakajima et al. ........... 118/715 |

* cited by examiner

Primary Examiner—John Rivell
(74) Attorney, Agent, or Firm—Henneman & Saunders; Larry E. Henneman, Jr.

(57) ABSTRACT

A novel method for bending tubes suitable for use in high-purity fluid handling systems includes selecting a tube made from a material having a grain-size number of at least 5, and forming a bend in the tube with a bend radius of greater than 1.5 times the diameter of the tube. Tubes bent according to the present invention are incorporated into high-purity systems as supply lines, product lines, and vacuum forelines, without the need for post-bend heat treatment or polishing.

44 Claims, 3 Drawing Sheets

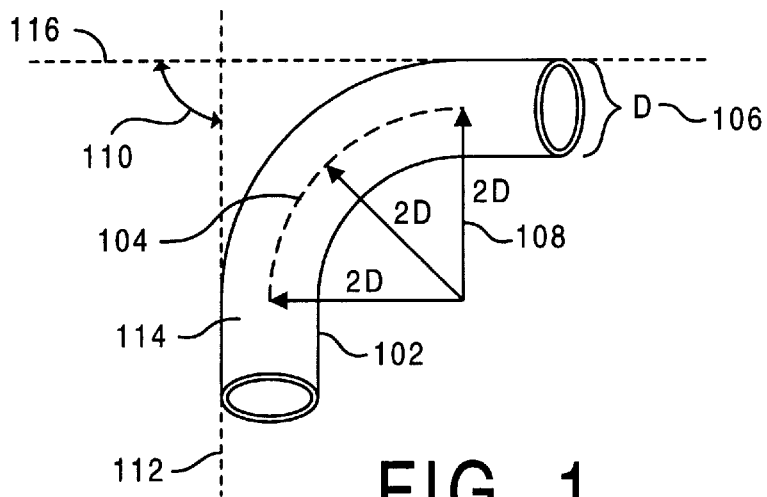
FIG. 1
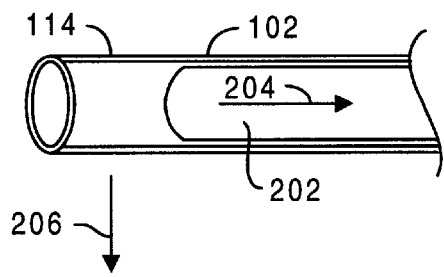
FIG. 2
| Tube Material | Stainless Steel | 304L, 316L | 302 |
| Grain Size # | ≥5 | 5, 8 | 304 |
| Bend Radius | 1.5D - 3D | 2D | 306 |
| Bend Angle | Any | 0 -90 Degrees | 308 |
FIG. 3

SYSTEM AND METHOD FOR USING BENT PIPES IN HIGH-PURITY FLUID HANDLING SYSTEMS

BACKGROUND OF THE INVENTION

1. Field of the Invention

The present invention relates generally to the field of high-purity plumbing systems, and more particularly to the field of plumbing high-purity systems in the fields of semiconductor processing, biopharmaceuticals, and the like.

2. Description of the Background Art

High purity plumbing systems face many constraints that are not major concerns in common plumbing systems (e.g., commercial and residential water supply systems). Of particular relevance to the present invention is the requirement that the inner walls of the pipes in high-purity systems be extremely smooth. In bio-pharmaceutical systems, rough surfaces inside pipes can harbor dangerous bacteria. In semiconductor processing systems, rough internal pipe surfaces cause an undesirable increase in particulates and outgassing. Therefore, to be acceptable for use in high-purity systems, it is generally accepted that the inner surfaces of pipes must have a roughness average ($R_a$) value of 25 $\mu$m or less.

Bending a pipe causes a surface roughness effect, known in the art as "orange peel", on the pipe's inner surface. For this reason, it is well accepted in the art that bent pipes are unsuitable for use in high purity systems, absent some post bend treatment. Instead, high purity systems are constructed by welding fittings to the ends of straight runs of pipe.

The fittings themselves are manufactured by bending pipe, but substantial post bend processing is required. The fittings are manufactured from pipe having a greater wall thickness than the pipe they will join, because the post bend polishing required to smooth the inner surface of the fitting removes a portion of the wall thickness. Further, because bending induces stresses in a pipe, a post-bend heat treatment, or anneal, is required to alleviate those stresses.

Flanges are welded to the fittings to facilitate coupling the fittings to other pipes. Welds are intrusive and cause metallurgical changes in the fitting, which result in diminished corrosion resistance. The welds also cause physical changes in the fittings, which disrupt the smoothness of the inner surface. Therefore, post-weld processing is also required to minimize these undesirable effects of welding.

Standard off-the-shelf fittings in the field are generally limited to angles of 45° and 90°. Further, due to space concerns, it is generally understood that the fittings should have as tight a bend as possible. Therefore, standard fittings are generally bent such that the radius of the bend is 1½ times the diameter of the tube (1½D). This value 1½D is standard in the industry because it is generally accepted that this is the tightest bend that can be produced without significant complications (e.g., pipe collapse, etc.). What is needed is a system and method for bending pipe that satisfies the rigid requirements of high purity systems, without the need for post-bend processing. What is also needed is a system and method for minimizing the number of welded fittings required in a high-purity fluid handling system.

SUMMARY

The present invention overcomes the problems associated with the prior art by providing a method of bending pipes such that the bent pipes are acceptable for use in high-purity fluid handling systems without the need for post-bend heat treatment or polishing. The invention facilitates the use of bent pipes, instead of welding fittings, in high-purity systems, resulting in a substantial savings in labor and materials.

A method of constructing a high-purity fluid handling system according to the present invention includes the steps of providing a metallic tube having a diameter (D) and a grain-size number of at least 5, forming a bend in the metallic tube, and installing said tube in said highpurity fluid handling system (e.g., semiconductor processing system, bio-pharmaceutical system, etc.). The radius of the bend in the tube is greater than one and one-half times the diameter (1.5D) of said tube. In a particular method, the radius of the bend is between 1.5D and 3D, and in an even more particular embodiment, the bend is a 2D bend.

Bends can be formed, according to the present invention, having any angle, thus providing an advantage over the prior art where typically only fittings having common bend angles (e.g., 30°, 45°, 90°, etc.) are commercially available. Further, multiple bends can be formed in a single pipe. Optionally, a non-metallic mandrel is used when forming the bends, to avoid marring the inner surface of the pipe.

In the particular disclosed methods, the tubes bent are constructed from stainless steel. Generally, the bent pipes are suitable for installation in a high-purity system without any post-bend heat treatment or polishing. However, if a system has particularly rigorous inner surface smoothness requirements, then the bent pipes can be subjected to an electropolishing process prior to being installed in the system.

A system incorporating pipes bent according to the present invention is also described. The system includes a chamber and a high-purity line in fluid communication with the chamber. The high-purity line is formed from a metal having a grain-size number of at least 5, has a diameter (D), and includes at least one bend having a radius greater than 1.5D. In one particular embodiment, the high-purity lines are main (e.g., diameter $\geq$1 inch) fluid supply lines, individual (diameter <1 inch) fluid supply lines, and vacuum forelines of a semiconductor processing system. Optionally, the high-purity lines are any line coming into contact with product inside a bio-pharmaceutical processing system.

BRIEF DESCRIPTION OF THE DRAWINGS

The present invention is described with reference to the following drawings, wherein like reference numbers denote substantially similar elements:

FIG. 1 is a representational view of a pipe having a bend formed therein;

FIG. 2 is a representational view of a pipe with a mandrel inserted therein;

FIG. 3 is a table listing general parameters for forming bends according to the present invention;

DETAILED DESCRIPTION

Figure 4:
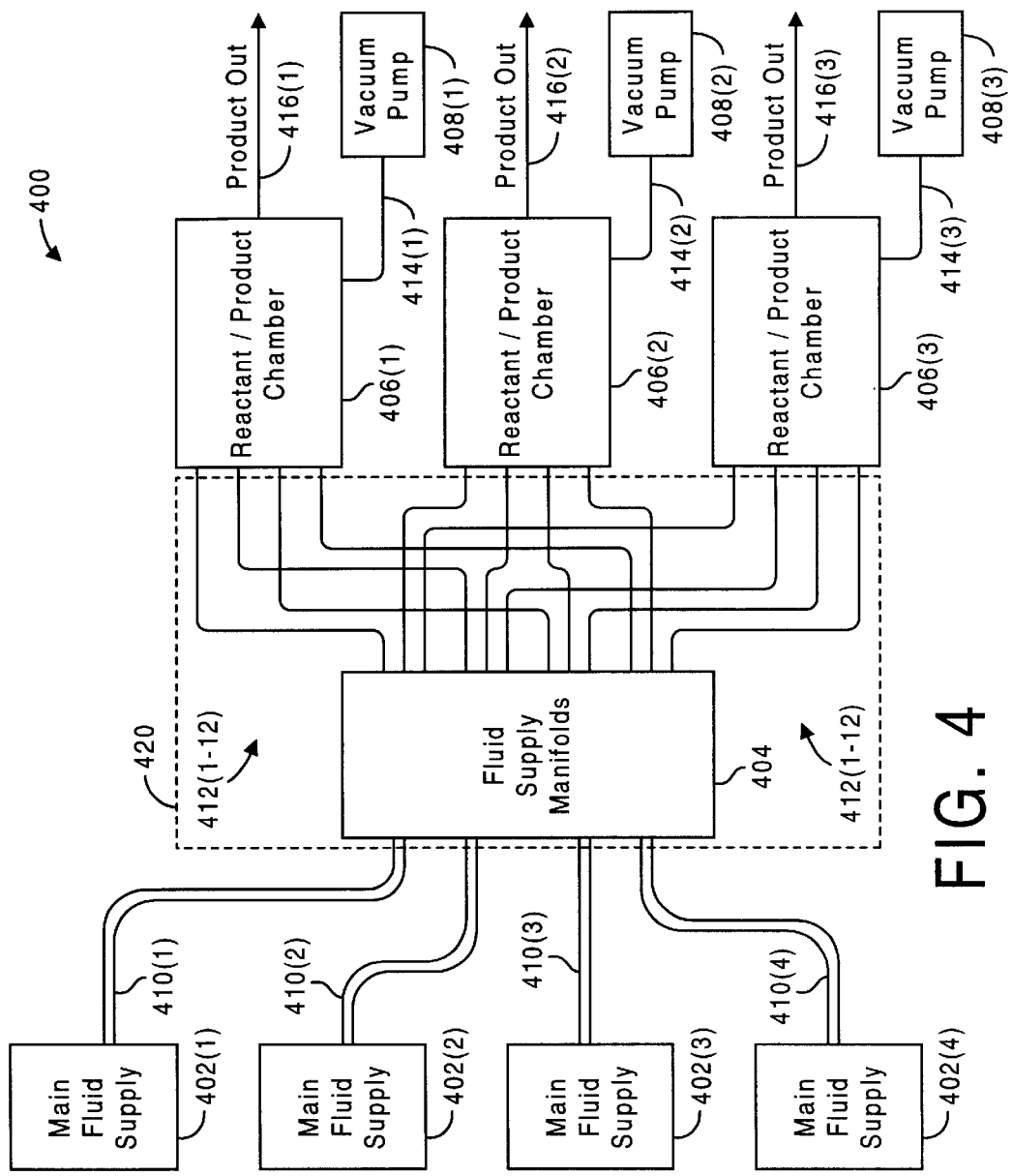
FIG. 4 is a block diagram of a high-purity system including tubes having bends formed therein according to the present invention.

The present invention overcomes the problems associated with the prior art, by providing a system and method for bending pipes without introducing an unacceptable amount of roughness (e.g., "orange peel") in the inner surface of the pipe, such that the pipe is acceptable for installation in high-purity fluid handling systems, without subjecting the pipe to post bend heat treatments or mechanical polishing processes. Using bent pipes formed according to the present invention in the construction of high-purity fluid handling systems, without the need for a post-bend heat treatment or polishing process, results in a substantial savings over the methods of the prior art. Further, forming multiple bends in a single tube reduces the number of welds necessary to construct a system, and thereby reduces the adverse affects associated with such welds (e.g., porosity, corrosion, reduced fluid conductance, etc.) In the following description, numerous specific details are set forth (e.g., particular types of materials) in order to provide a thorough understanding of the invention. Those skilled in the art will recognize, however, that the invention may be practiced apart from these specific details. In other instances, details of well known pipe bending practices (e.g., the use of automated pipe bending tools and equipment, particular tube sizes and wall thicknesses, etc.) have been omitted, so as not to unnecessarily obscure the present invention.

FIG. 1 is a representational view of a pipe 102 having a bend 104 formed therein. Pipe 102 is formed from a metal tube having a diameter (D) 106. Bend 104 has a radius of curvature 108 that, in this particular example, is twice (2D) the diameter (D) 106 of pipe 102. It is common in the art to refer to the radius of curvature of a bend as a multiple (e.g., 1D, 1.5D, 2D, 2.5D, etc.) of the diameter (D) of the tube in which the bend is formed. The angle 110 of bend 104 is measured between a line 112 (along the edge of the deflected portion 114 of pipe 102) and a line 116 (along the edge of portion 114 prior to being bent). For example, very slight bends in pipe 102 measure only a few degrees, whereas a "U" bend measures 180 degrees.

FIG. 2 is a representational view of pipe 102 showing how bend 104 is formed therein. In particular, bend 104 is formed in pipe 102 using a mandrel 202. Mandrel 202 is placed in pipe 102 prior to bending, and then withdrawn from pipe 102 in the direction indicated by arrow 204 as the bending equipment (not shown) forces portion 114 of pipe 102 in a direction indicated by arrow 206. Forming bends in pipes in this manner is well known in the pipe bending art, except that mandrel 202 is constructed from a non-metallic material. In one particular embodiment, mandrel 202 is constructed from a material sold by DuPont under the tradename DELRONO®.

The use of a non-metallic mandrel 202 is not considered to be an essential element of the present invention. In fact, tubes suitable for use in high-purity systems can be formed according to the present invention, as described below, without the use of a non-metallic mandrel. However, using non-metallic mandrel 202 increases the yield of the bending process, by reducing the occurrence of marring the inner surface of the pipe by the mandrel.

FIG. 3 shows a table 300 that provides the general parameters for forming bends suitable for use in high-purity systems according to the present invention. The first row 302 of table 300 indicates that bends have been successfully (i.e., minimal amount of orange peel on the inner surface of the bent pipe) formed in tubes made of stainless steel, the material of choice for high-purity systems. In particular, tubes made of 304L and 316L stainless steel have been bent successfully according to the present invention.

Row 304 indicates that the tubes bent must be manufactured from a material having a grain-size number of at least 5. The grain-size number (G) is a parameter standardized by the American Society for Testing and Materials (ASTM), and is defined by $$N=2^{G-1}$$

where N is the number of grains observed in an area of 1 in.$^2$ on a photomicrograph taken at a magnification of 100×.

The selection of tube material having a grain-size number of at least 5 is a particularly important aspect of the present invention. The inventor has discovered that there is a correlation between the amount of orange peel effect that results from a bend and the grain-size number of the material from which the tube is made. Selecting material having a grain size number of at least 5 facilitates the formation of reasonably tight bends without generating the orange peel effect on the inner surface of the tube.

Row 306 indicates that bends having a bend radius between 1.5D and 3D have been successfully formed. Like grain-size number, the bend radius also affects the amount of orange peel effect generated on the inner surface of a bent tube. The smaller the bend radius, the more likely it is that orange peel effect will occur.

Because the amount of orange peel effect depends on both the grain-size number and the radius of a bend, there is some interrelationship between these properties. For example, it is expected that tighter bends can be successfully formed in materials having a larger grain size number (e.g., 8). The inventor has found that using material having a grain-size number of 5 and bending at a radius of 2D consistently results in bends with no orange peel effect that are suitable for use in a high-purity system without a post-bend heat treatment or polishing process. For the 2D bends in materials having a grain-size number of at least 5, before and after profilometer readings indicate a change in roughness average (Ra) of 2–3 micro-inches, at most, on the inner surface of the tube. Thus, if a tube has an original inner surface roughness average of 10 micro-inches, then a 90 degree bend formed with a 2D radius will result in a roughness average in the compression and tensile areas of the bend of 12–13 micro-inches, at most. By contrast, in welded systems the internal weld beads have a surface roughness average on the order of 200 micro-inches.

Row 308 indicates that bends of any angle can be formed according to the present invention, though bends between 0 and 90 degrees are the most likely to be incorporated into a high-purity system. The availability of pipes bent at any desirable angle provides an advantage over the prior art, where typically only 45 and 90 degree fittings are commercially available.

FIG. 4 is a block diagram of a high-purity fluid handling system 400 including a plurality of main fluid supplies 402(1–4), an array of fluid supply manifolds 404, a plurality of reactant chambers 406(1–3), and a plurality of vacuum pumps 408(1–3), all interconnected via pipes bent according to the present invention. High-purity fluid handling system 400 is intended to represent any of a number of high-purity systems including, but not limited to, semiconductor processing systems and bio-pharmaceutical systems.

Fluid supplies 402(1–4) are coupled to manifolds 404 via a plurality of main supply lines 410(1–4), respectively. Main supply lines 410(1–4) typically carry large volumes of fluid to a number of systems, and therefore are formed of tubes having relatively large diameters, ranging from 1–6 inches or larger. It is well accepted in the field that such large diameter main supply lines in high purity systems are constructed with welded fittings, and that such main supply lines cannot be formed by bending alone, especially without some post-bend heat treatment or polishing process. Contrary to this well accepted principle, main supply lines 410(1–4) are formed by bending, instead of being constructed with welded fittings.

Fluid supply manifolds 404 receive fluids via main supply lines 410(1–4) and transmit hose fluids, via a plurality of individual supply lines 412(1–12) to each of chambers 406(1–3). Each of chambers 406(1–3) has four incoming supply lines to provide fluid from one of main fluid supplies 402(1–4), respectively. Because supply lines 412(1–12) carry smaller volumes of fluids, their diameters are typically less than 1 inch.

The region 420 of system 400 is commonly referred to in the field of art as the "jungle," because region 420 includes a large number of small diameter pipes. It is known in the art to form pipes in the jungle by hand-bending small diameter (e.g., 0.25 in.) pipes, but it is also well accepted that such hand bent pipes require a large bend radius (e.g., 10D). Pipes for use in high-purity systems with bends having a small bend radius (e.g., less than 3D) cannot be consistently made with hand benders. The large bend radius requirement makes it more difficult to route pipes in the jungle, and, therefore, many manufacturers opt for welded fittings with a smaller bend radius (e.g., less than 3D), with the commercial standard being 1.5D.

Contrary to the well accepted practice of having to choose between large radius bent tubes and small radius welded fittings, supply tubes 412(1–12) are formed from stainless steel tubing, as described above with respect to FIGS. 1–3, to have bend radii between 1.5D and 3D, preferably 2D. The 2D bend radii of tubes 412(1–12) save space, and make it much easier to route tubes in the jungle. Further, bending tubes 412(1–12) instead of welding results in a substantial savings in labor, and also provides a substantially smoother inner tube surface than with welds, as described above with respect to FIG. 3.

Reactant/Product chambers 406(1–3) receive fluids via supply lines 412(1–12) for use in some process. If system 400 is a semiconductor processing system, fluid supply lines 412(1–12) may supply ultra-high-purity gasses for use in integrated circuit manufacturing. As another example, if system 400 is a bio-pharmaceutical system, the supply lines 412(1–12) may provide pharmaceutical materials to chambers 406(1–3) for mixing into a product which can be delivered via product lines 416(1–3) for packaging or further processing. Lines such as lines 416(1–3) which come into contact with pharmaceutical products must also meet the strict inner surface standards described above, and can be bent according to the present invention.

Vacuum pumps 408(1–3) are used to evacuate chambers 406(1–3), via vacuum forelines 414(1–3), respectively. Vacuum forelines must also meet the strict inner surface standards described above (e.g., no orange peel effect), because imperfections in the inner surfaces of vacuum systems can trap gasses and/or facilitate increased levels of outgassing, and thereby make it more difficult to draw a vacuum on a system. It is, therefore, well accepted that vacuum forelines must also be manufactured from welded fittings. Contrary to this well accepted principle, vacuum forelines 414(1–3) are bent according to the present invention, as described above with respect to FIGS. 1–3, without generating orange peel effect on their inner surfaces, and are therefore acceptable for use as vacuum forelines.

Figure 5:
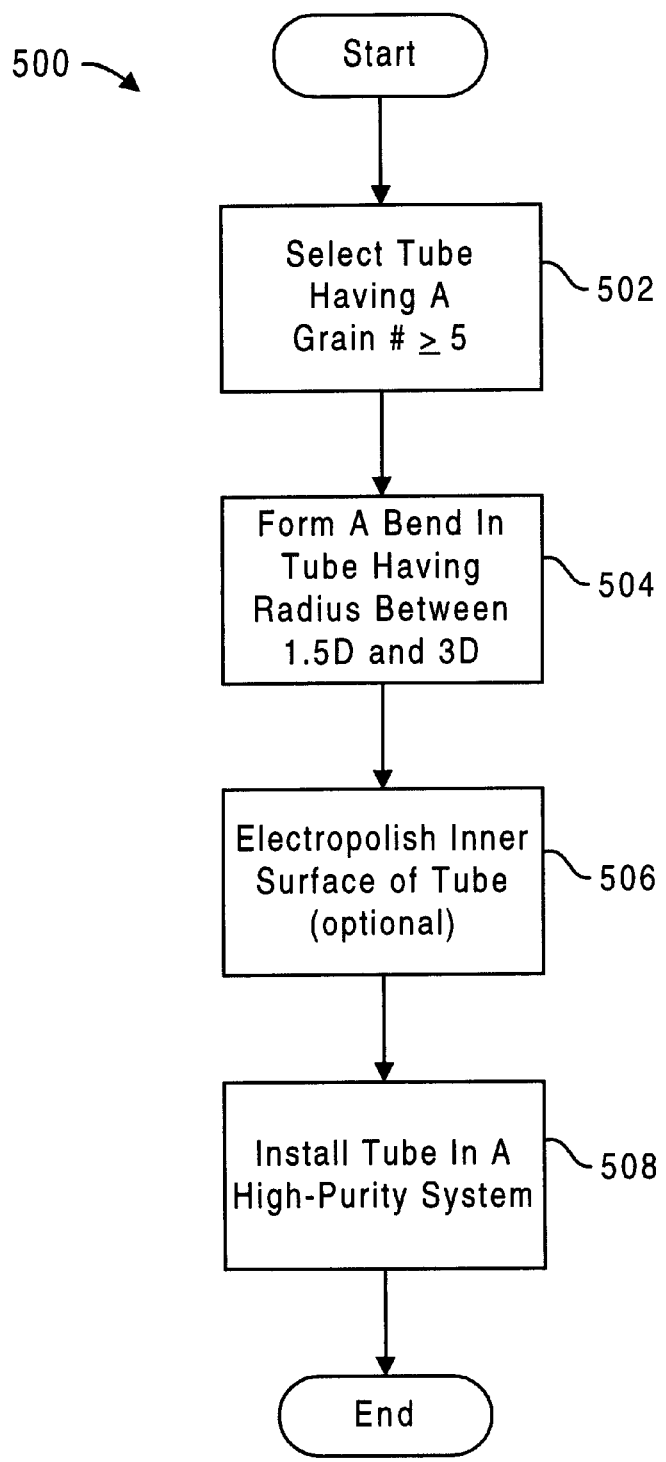
FIG. 5 is a flow chart summarizing one method of forming and using a bent tube according to the present invention.

FIG. 5 is a flow chart summarizing one particular method 500 of forming pipes for use in a high-purity fluid handling system. In a first step 502, a tube made from material having a grain-size number of at least 5 is selected. Next, in a second step 504, a bend is formed in the tube having a bend radius between 1.5D and 3D. Then, in an optional third step 506, the inner surface of the tube is electropolished. Finally, in a fourth step 508, the bent tube is installed in a high-purity system. Note that no post-bend heat treatment is required prior to installing the pipe.

Note that third step 506 is optional, and is not considered to be an essential element of the sex present invention. As indicated above with respect to FIG. 3, some slight (e.g., a change in roughness average of about 2–3 micro inches) inner surface imperfections occur as a result of bending according to the present invention. However, these imperfections do not generally render the tube unsuitable for use in the above-described high-purity systems. However, if such imperfections are unacceptable for a particular application, then they can be removed by electropolishing. For an explanation of an electropolishing method for bent tubes, see U.S. Pat. No. 5,958,195, issued Sep. 28, 1999, to Lorincz, et al., which is incorporated herein by reference in its entirety. Forming a tube by bending according to the present invention, and then electropolishing the bent tube prior to installation in a high-purity system is considered to be a substantial improvement over the prior art method of constructing fluid supply lines from welded fittings.

The description of particular embodiments of the present invention is now complete. Many of the described features may be substituted, altered or omitted without departing from the scope of the invention. For example, pipes bent according to the present invention may be incorporated into systems (e.g., chemical manufacturing system), other than those specifically mentioned. As another example, tubes constructed from materials other than stainless steel may be bent according to the present invention . These and other deviations from the particular embodiments shown will be apparent to those skilled in the art, particularly in view of the foregoing disclosure.

We claim:

1. A method of constructing a high-purity fluid handling system comprising: providing a metallic tube having a diameter (D) and a grain-size number of at least 5; forming a bend in said metallic tube, said bend having a radius greater than one and one-half times said diameter of said tube; and installing said tube in said high-purity fluid handling system.

2. A method according to claim 1, wherein said step of installing said tube in said high-purity system includes installing said tube in said high-purity fluid handling system without subjecting said tube to a post-bend heat treatment.

3. A method according to claim 1, wherein said step of installing said tube in said highpurity system includes installing said tube in said high-purity fluid handling system without subjecting said tube to a post-bend polishing process.

4. A method according to claim 1, wherein said metallic tube comprises stainless steel.

5. A method according to claim 4, wherein said metallic tube comprises 300 series stainless steel.

6. A method according to claim 5, wherein said metallic tube is constructed from a material selected from one of 304L stainless steel and 316L stainless steel.

7. A method according to claim 1, wherein said metallic tube has a grain-size number of at least 8.

8. A method according to claim 1, wherein said bend has a radius of at least twice said diameter of said metallic tube.

9. A method according to claim 8, wherein said metallic tube has a grain size number of at least 8.

10. A method according to claim 9, wherein said metallic tube comprises stainless steel.

11. A method according to claim 10, wherein said step of installing said tube in said high-purity system includes installing said tube in said high-purity fluid handling system without subjecting said tube to a post-bend heat treatment.

12. A method according to claim 10, wherein said step of installing said tube in said high-purity system includes installing said tube in said high-purity fluid handling system without subjecting said tube to a post-bend polishing process.

13. A method according to claim 1, wherein the angle of said bend is other than 45 degrees or 90 degrees.

14. A method according to claim 1, wherein said step of forming a bend in said tube includes using a non-metallic mandrel to form said bend.

15. A method according to claim 1, wherein said diameter of said tube is at least 1 inch.

16. A method according to claim 1, wherein:
said diameter of said tube is less than 1 inch; and
said radius of said bend is no more than 3 times said diameter.

17. A method according to claim 16, wherein said radius of said bend is no more than 2 times said diameter.

18. A method according to claim 1, wherein the inner surface of said tube is electropolished after said step of forming a bend in said tube and before said step of installing said tube.

19. A method according to claim 1, wherein said step of forming a bend in said metallic tube comprises forming a plurality of bends in said tube, each of said bends having a radius greater than one and one-half times said diameter of said tube.

20. A method according to claim 1, wherein:
said high-purity fluid handling system is a semiconductor processing system; and
said tube is installed as a fluid supply line.

21. A method according to claim 1, wherein:
said high-purity fluid handling system is a pharmaceutical system; and
said tube is installed as a fluid supply line.

22. A method according to claim 1, wherein said tube is installed as a vacuum foreline.

23. A high-purity fluid handling system comprising:
a chamber; and
a high-purity line in fluid communication said chamber, said high-purity line being formed from a metal having a grain-size number of at least 5, and having a diameter (D) and a bend formed therein, said bend having a radius greater than one and onehalf times said diameter.

24. A high-purity fluid handling system according to claim 23, wherein said high-purity line was not subjected to a post-bend heat treatment.

25. A high-purity fluid handling system according to claim 24, wherein said high-purity line was not subjected to a post-bend polishing process.

26. A high-purity fluid handling system according to claim 24, wherein said high-purity line comprises stainless steel.

27. A high-purity fluid handling system according to claim 26, wherein said high-purity line comprises 300 series stainless steel.

28. A high-purity fluid handling system according to claim 27, wherein said high-purity line is constructed of a material selected from one of 304L stainless steel and 316L stainless steel.

29. A high-purity fluid handling system according to claim 23, wherein said high-purity line is constructed from a material having a grain-size number of at least 8.

30. A high-purity fluid handling system according to claim 23, wherein said bend has a radius of at least twice said diameter of said high-purity line.

31. A high-purity fluid handling system according to claim 30, wherein said high-purity line is formed from a material having a grain size number of at least 8.

32. A high-purity fluid handling system according to claim 31, wherein said high-purity line comprises stainless steel.

33. A high-purity fluid handling system according to claim 32, wherein said high-purity line has not been subjected to a post-bend heat treatment.

34. A high-purity fluid handling system according to claim 32, wherein said high-purity line has not been subjected to a post-bend polishing process.

35. A high-purity fluid handling system according to claim 23, wherein said bend is other than 45 degrees or 90 degrees.

36. A high-purity fluid handling system according to claim 23, wherein said bend is formed using a non-metallic mandrel.

37. A high-purity fluid handling system according to claim 23, wherein said diameter of said high-purity line is at least 1 inch.

38. A high-purity fluid handling system according to claim 23, wherein:
said diameter of said high-purity line is less than 1 inch; and
said radius of said bend is no greater than 3 times said diameter.

39. A high-purity fluid handling system according to claim 38, wherein said radius of said bend is no greater than 2 times said diameter.

40. A high-purity fluid handling system according to claim 23, wherein the inner surface of said high-purity line is electropolished.

41. A high-purity fluid handling system according to claim 23, wherein:
said high-purity fluid handling system is a semiconductor system; and
said high-purity line is a fluid supply line.

42. A high-purity fluid handling system according to claim 23, wherein:
said high-purity fluid handling system is a pharmaceutical system; and
said high-purity line is a product line.

43. A high-purity fluid handling system according to claim 23, wherein said high-purity line is a vacuum foreline.

44. A high-purity system according to claim 23, wherein said high-purity line includes a plurality of bends, each of said bends having a radius greater than one and one-half times said diameter of said high-purity line.

* * * * *

UNITED STATES PATENT AND TRADEMARK OFFICE
CERTIFICATE OF CORRECTION

| | | |
|---|---|---|
| PATENT NO. | : 6,513,540 B2 | Page 1 of 1 |
| DATED | : February 4, 2003 | |
| INVENTOR(S) | : Erdei et al. | |

It is certified that error appears in the above-identified patent and that said Letters Patent is hereby corrected as shown below:

<u>Column 7,</u>
Line 46, insert -- with -- between "communication" and "said."

Signed and Sealed this

Twenty-fourth Day of June, 2003

JAMES E. ROGAN
*Director of the United States Patent and Trademark Office*